United States Patent Office 3,493,324
Patented Feb. 3, 1970

3,493,324
PROCESS FOR PROTECTING SHIP'S HULLS FROM FOULING
Albert Calvarin, Le Vesinet, and Pierre Lange, Antony, France, assignors to Esso Research and Engineering Company, a corporation of Delaware
No Drawing. Filed Jan. 4, 1967, Ser. No. 607,154
Claims priority, application France, Jan. 5, 1966, 44,947
Int. Cl. A61l 3/00
U.S. Cl. 21—58          7 Claims

ABSTRACT OF THE DISCLOSURE

Process for protecting submerged ship surfaces coated with antifouling paint containing a first toxin from fouling by marine organisms employs a second, supplementary toxin lixiviated from mobile distributing units positioned adjacent the submerged surfaces only when the combined action of ship movement and first toxin are insufficient to prevent attachment of said organisms to the submerged surfaces.

---

The present invention is concerned with a process for protecting ship's hulls, and in a general way all submerged surfaces, from fouling.

While vessels remain in port, or as soon as they stop, or are even proceeding a low speed, enormous numbers of animal and vegetable organisms, barnacles, algae etc., attach themselves to the hull. The surface roughness thus produced is well known to increase the vessel's resitance to travel. The result of this is an appreciable decline in speed and therefore a substantial increase in the running expenses.

At the present moment, the so-called "anti-fouling" paints constitute the sole preventive remedy, but their efficacy depends on the nature of the previous paint to which they have been applied, on the thickness of the coat produced and on the atmospheric conditions obtaining at the time of application.

Moreover, the toxic action of this paint is bound up with their rate of lixiviation, which is generally kept low, for instance in the region of 10, to reduce as far as possible the spread of the toxic substances emitted by these paints, which at present constitutes a dead loss during the movement of the vessel, when the fouling organisms cannot attach themselves to the hull, and this entails the necessity of replacing the coat of anti-fouling paint. It is well known that the rate of lixiviation is equal to the number of microgrammes of toxic metal entering into solution per sq. cm. per 24 hours.

The present invention makes it possible to obviate these draw-backs, while enabling the submerged surface to be protected when required, i.e. during the period when the attaching of the living organisms is deemed most intensive.

For this purpose, the invention provides a process consisting essentially of creating at will, when needed, adjacent to the submerged surfaces to be protected, a toxic zone acting on the organisms to be combated.

For carrying out such a process, mobile distributing units for poisons are provided, which can be placed at will in the vicinity of the hull round the vessel as soon as the latter stops or is moving at reduced speed.

The poisons applied according to the invention are selected from the poisons possessing appropriate solubility, neither too great nor too small, in sea-water, in such a way that they can diffuse, without, however, attaining their solubility product so as to avoid their precipitation in the zone to be protected. Suitable examples of toxic substances are salts of mercury, silver and preferably copper, or combinations of these salts.

The effective concentrations in the vicinity of the surfaces to be protected or to be cleaned depend in particular on the nature of the poisons used and the time of emission envisaged. The toxic action is already appreciable with concentrations of 0.2 p.p.m. or more with mercury and silver, and sufficient to inhibit all parasitic formation with a concentration higher than 0.5 p.p.m. of copper.

The distributing units for carrying out the process of the invention may consist of any supports for the poison whereby it is possible to submerge the latter in the vicinity of the surface to be protected. Thus for instance, such supports can consist of porous bodies impregnated with or containing within themselves the poison or poisons, or any other form of execution. The distributing device must have a large working surface through its geometry in order to increase the proportion of lixiviation of the poison.

According to one of the advantageous embodiments of the invention, the distributing unit consists, for instance of any enclosed container provided with permeable orifices, for instance, pierced with holes that may if necessary be closed by porous diaphragms for slowing down the diffusion of the poison.

It is possible to use, for instance, cylindrical containers 1 to 2 m. long by 5 to 10 cm. in diameter, arranged about every 5 m. along the hulls, about 10 cm. below the surface of the water.

Thanks to the invention it is possible to work with rates of lixiviation in region of 200 or more, thus obtaining maximum efficacy.

The process according to the invention is of course applicable in a general way to any submerged surface likely to become covered with animal or vegetable organisms.

The following examples, which are given by way of illustration and in no sense restrictively, will better show the scope and importance of the invention.

In the first three examples, algae were treated, which possess higher resistance than animal organisms, and fading and loss of colour were adopted as criteria of efficacy; both furnish certainty of destruction in a more or less short period.

In the tables showing the results obtained, the following code was adopted for denoting changes in the state of the algae through the action of poisons:

RAS: The sample displays no difference in appearance in relation to the control.
P: Traces of fading
P+: Appreciable fading
P++: Very appreciable fading
P+++: Almost total fading
P++++: Algae entirely discoloured These three tests were carried out in the laboratory in tanks of stagnant sea water used under the following conditions:

For each poison used, a series of tanks holding about 5 litres of sea water, was prepared; in each of these tanks an identical sample, freshly collected, of the same green seaweed, the enteromorph, was placed after washing.

These specimens consisted of a small number of fronds of seaweed in full development and still attached to a stone where they had developed naturally: these tanks were illuminated identically by window giving a few hours of sunshine per day.

At the start of the experiment, known quantities of poison were placed in increasing proportions in each of the tanks, one of them being free from them to act as control. Concentrations ranging from 0.1 to 1, 2, 5, 10, 20 mg. poison per litre were prepared.

Example 1

With mercuric chloride, the following results were obtained:

| Quantity of mercury, Mg./l. | After 12 h. | After 1 day | After 2 days | After 3 days |
|---|---|---|---|---|
| 5 | P | P+++ | P++++ | P++++ |
| 2 | P | P+++ | P++++ | P++++ |
| 1 | RAS | P++ | P+++ | P++++ |
| 0.5 | RAS | P+ | P++ | P++ |
| 0.2 | RAS | RAS | P | P |
| Control | RAS | RAS | RAS | RAS |

Example 2

With silver nitrate the following results were obtained:

| Quantity of silver, mg./l. | Length in days | | | | | | | |
|---|---|---|---|---|---|---|---|---|
| | 1 | 2 | 3 | 4 | 7 | 8 | 9 | 10 |
| 1 | RAS | P | P+ | P+++ | | | | |
| 0.7 | RAS | P | P+ | P++ | P+++ | P++++ | | |
| 0.5 | RAS | RAS | P+ | P++ | P++ | P++++ | | |
| 0.3 | RAS | RAS | P | P+ | P+ | P+ | P+ | P++ |
| 0.2 | RAS | RAS | P | P+ | P+ | P+ | P+ | P+ |
| 0.1 | RAS | RAS | RAS | RAS | RAS | P | P | P |
| Control | RAS | RAS | RAS | RAS | RAS | RAS | RAS | RAS |

Example 3

With copper sulphates the following results were obtained:

| Quantity of Copper, mg./l. | Length in days | | | | |
|---|---|---|---|---|---|
| | 1 | 2 | 3 | 4 | 7 |
| 10 | P+ | P+ | P++ | P++ | P+++ |
| 7 | P+ | P+ | P++ | P++ | P+++ |
| 5 | P | P+ | P++ | P++ | P+++ |
| 2 | P | P+ | P++ | P++ | P+++ |
| 1 | RAS | P | P+ | P++ | P+++ |
| 0.5 | RAS | P | P+ | P++ | P+++ |
| 0.2 | RAS | RAS | RAS | P | P++ |
| Control | RAS | RAS | RAS | RAS | RAS |

Example 4

This test was carried out at the entrance to a port.

A spreader was made consisting of a cylinder of plastic material 1.30 m. long and 6 cm. in diameter. It was drilled with three holes regularly spaced along a generating line, each of these holes, 1 mm. in diameter, being blocked by a felt diaphragm 5 mm. thick and a hole 1 mm. in diameter on the opposite generating line.

It was placed horizontally in sea-water 10 cm. from the surface, the three holes downwards, to enable the toxic liquid to flow away, this being replaced by water entering through the top hole.

It has been found that higher concentrations than 1 p.p.m. were obtained at distances exceeding 4 m. by maintaining, under these conditions, sufficient concentrations to eliminate the fouling in 48 hours.

There was moreover obtained a proportion of copper in excess of 0.5 p.p.m. at a distance of about 6 m. and at a depth of more than 3 m., making it possible to destroy algae reliably after a period of 48 hours.

What is claimed is:

1. A process for removing animal and vegetable fouling organisms, and preventing the attachment of same to ship surfaces submerged in sea water, which submerged surfaces are coated with an antifouling paint containing a first toxin and having a lixiviation rate such that the continued action of ship and first toxin are insufficient to prevent the attachment of the fouling organisms to the submerged surfaces, which process consists essentially of causing a second toxin and supplementary to said first toxin to be lixiviated into a zone adjacent to the submerged surfaces, the second toxin being lixiviated into the zone only when the combined action of ship movement and first toxin are insufficient to prevent the attachment of the fouling organisms to the submerged surfaces, lixiviating the second toxin from mobile distributing units positioned adjacent to the submerged surfaces and below the water line, and providing a toxic zone adjacent to the submerged surfaces, thereby causing the removal of the fouling organisms from the submerged surfaces and preventing the attachment of the fouling organisms to the submerged surfaces.

2. The process of claim 1 wherein the submerged surfaces are the hull of a ship and the second toxin consists essentially of a member selected from the group consisting of the salts of copper, silver, mercury, and mixtures thereof.

3. The process of claim 2 wherein the concentration of the second toxin in the toxic zone is at least about 0.2 p.p.m. when the second toxin is a mercury salt.

4. The process of claim 2 wherein the concentration of the second toxin in the toxic zone is at least about 0.5 p.p.m. when the second toxin is a copper salt.

5. The process of claim 2 wherein the concentration of the second toxin in the toxic zone is at least about 0.2 p.p.m. when the second toxin is a silver salt.

6. The process of claim 2 wherein the ship is moving but at a speed insufficient to prevent the attachment of fouling organisms.

7. The process of claim 2 wherein the ship is docked.

References Cited

UNITED STATES PATENTS

| 429,125 | 6/1890 | Freeborn. |
| 1,973,813 | 9/1934 | Kelley. |
| 2,044,772 | 6/1936 | Conn. |
| 2,138,831 | 12/1938 | Brammer. |
| 3,279,980 | 10/1966 | Stern. |

MORRIS O. WOLK, Primary Examiner

J. T. ZATARGA, Assistant Examiner

U.S. Cl. X.R.

106—15